(No Model.) 2 Sheets—Sheet 2.
C. T. HUTCHINSON.
METHOD OF AND APPARATUS FOR CONTROLLING ELECTRIC MOTORS AND GENERATORS.
No. 467,230. Patented Jan. 19, 1892.
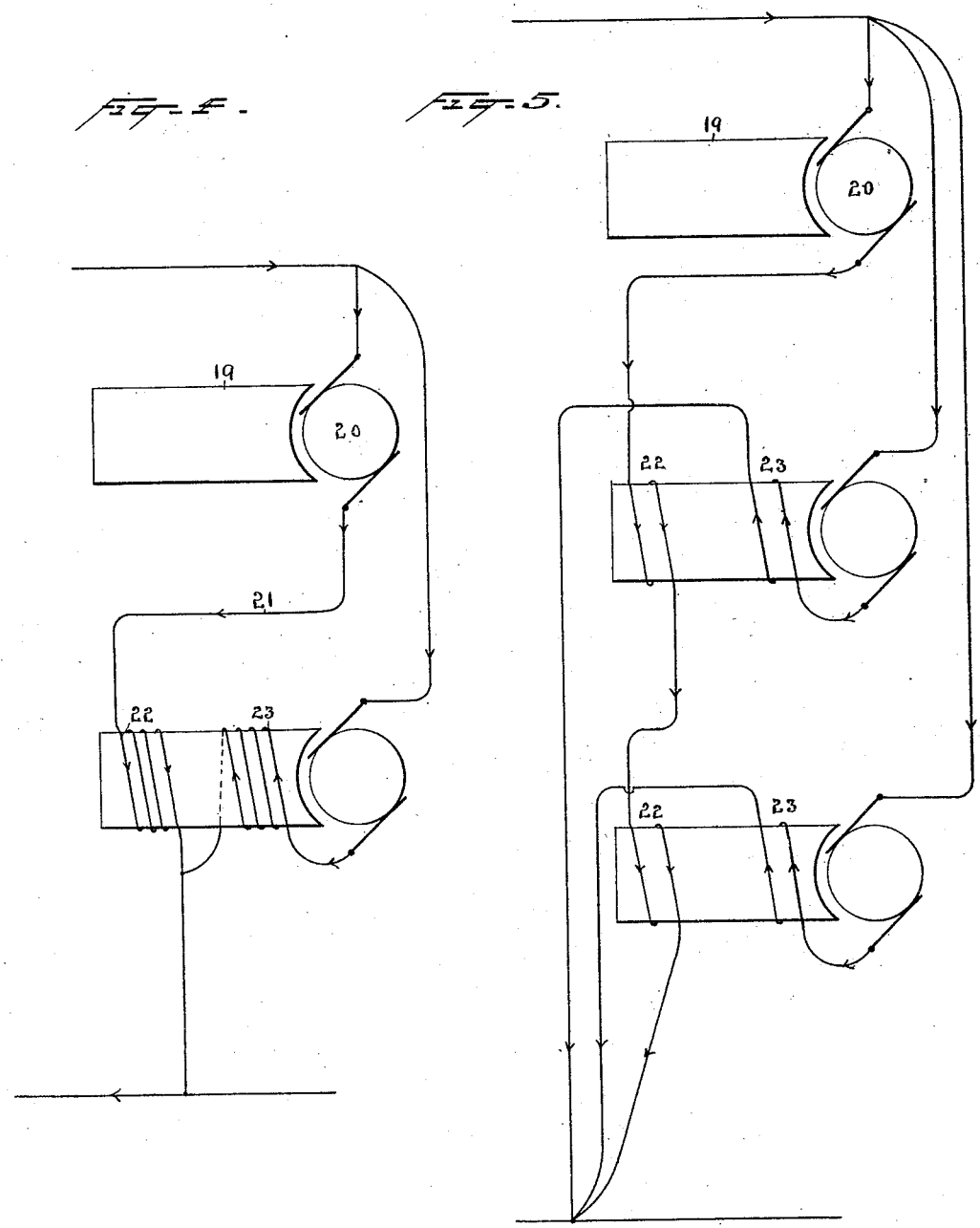
Witnesses
Norris S. Clark.
N. F. Oberlis
Inventor
C. T. Hutchinson,
By his Attorneys
Dyer & Seely.

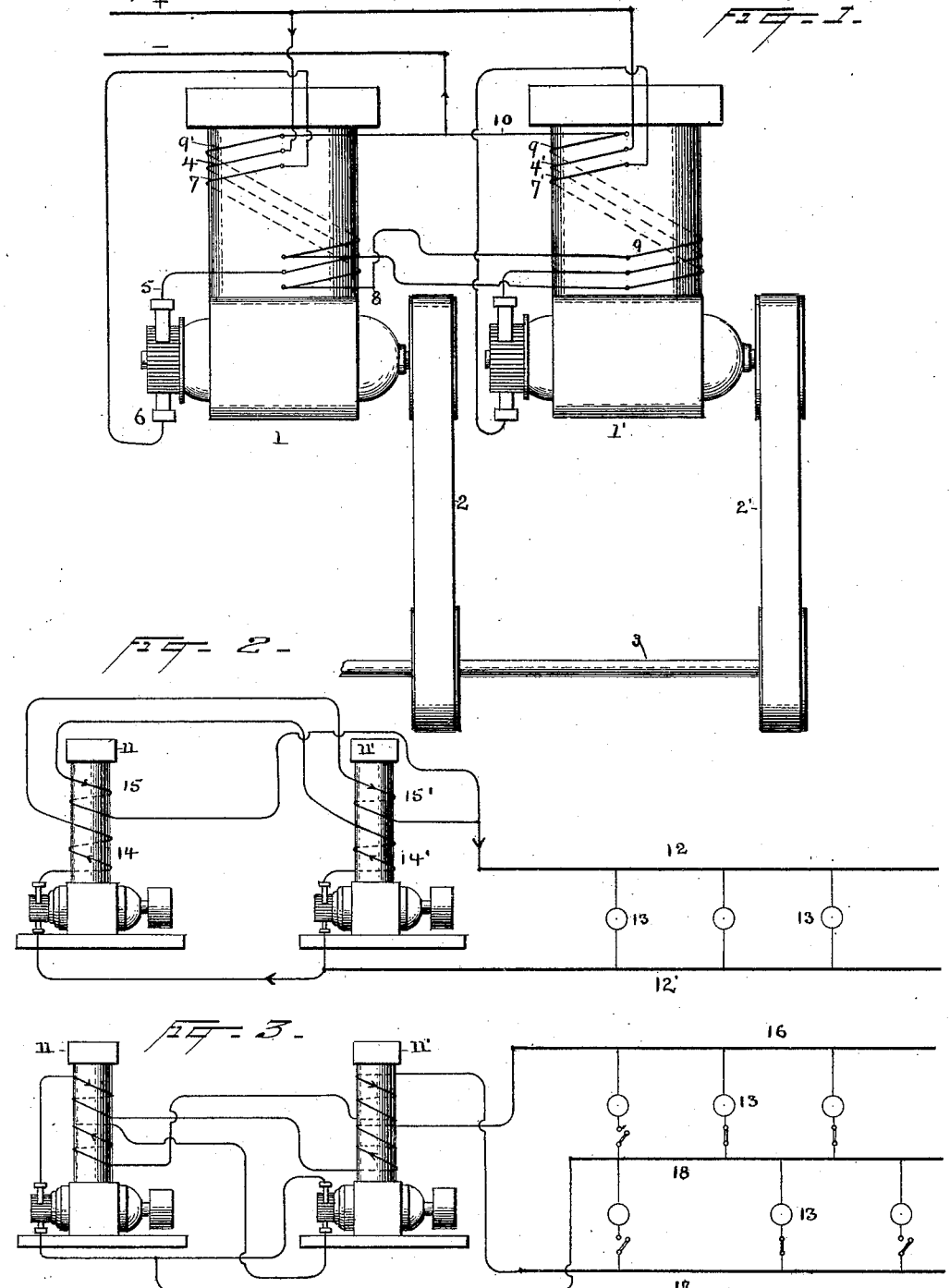

# UNITED STATES PATENT OFFICE.

CARY T. HUTCHINSON, OF NEW YORK, N. Y., ASSIGNOR TO THE EDISON GENERAL ELECTRIC COMPANY, OF SAME PLACE.

METHOD OF AND APPARATUS FOR CONTROLLING ELECTRIC MOTORS AND GENERATORS.

SPECIFICATION forming part of Letters Patent No. 467,230, dated January 19, 1892.

Application filed November 11, 1890. Serial No. 371,012. (No model.)

*To all whom it may concern:*

Be it known that I, CARY T. HUTCHINSON, a citizen of the United States, residing in New York city, in the county and State of New York, have invented a certain new and useful Method of and Apparatus for Controlling Electric Motors and Generators, of which the following is a specification.

The present invention relates to a method of equalizing the work done by two or more motors, especially when said motors are connected to a common circuit and to a common load, both being belted, for example, to the same shaft; and the invention relates to the method of equalizing the work done by two or more generators—for example, when driven by separate engines and one revolves at a higher speed than the other, both being connected to the same circuit.

The invention also relates to the system and apparatus for accomplishing the above-named results, as hereinafter fully described.

In the accompanying drawings, which illustrate the invention, Figure 1 is a diagrammatic view showing the invention applied to two motors. Fig. 2 is a similar view showing two dynamos connected in multiple to a single circuit. Fig. 3 is a similar view of a three-wire system, and Figs. 4 and 5 are similar views of modified arrangements hereinafter described.

In Fig. 1 are shown two motors 1 1', having belts 2 2' extending to and driving a single shaft 3, which may be, for example, the axle of an electrically-propelled car. The motors illustrated are series-wound machines, although motors with shunt windings may be used. The circuit of the motors is as follows: from the + side of the line through the main field-magnet coil 4 to commutator-brush 5, through the armature-coil to commutator-brush 6 to an extra field-magnet coil 7 in the same direction as in the main coil, thence by wire 8 to an extra field-magnet coil 9 on the second motor in an opposite direction from the main field-magnet coil, and thence by wire 10 back to the negative side of the supply-circuit. The circuit of motor 1' is similarly arranged—that is to say, the circuit passes through the main and extra field-magnet coil in the same direction, and through an extra coil on motor 1 in an opposite direction, as can be readily traced on the drawings. If a larger number of motors than two is used, the number of extra coils will be correspondingly increased. With the two motors connected as above described, suppose that for any reason one motor has more current flowing in its armature than the other. To diminish this current (in order to make it approximately equal to that in the other motor) the counter electro-motive force of the first motor must be increased. This is done by increasing the magnetic field by means of the extra field-magnet coil 7, the effect of which is cumulative with the main field-coil. At the same time the counter electro-motive force of the other motor would be decreased by the extra coil 9 acting differentially with its main field-magnet coil. On the other hand, if the first motor carries too little current, its counter electro-motive force must be diminished. This is done by means of the extra field-magnet coil 9' acting differentially with the main coil. The difference between the currents in the two motors will be practically proportional to the difference of the counter electro-motive forces of the two, and, as in the arrangement described, this difference of current is used as the regulating magnetizing force, the adjustment or regulation will be automatic. When, for example, the current in the first motor branch and in the second motor branch are equal, the magnetizing effect of coil 7 is just balanced by that of 9' and 7' by 9; but if the current in the first branch is in excess of the current in the second branch the effect of coil 7 overbalances that of 9'. Hence the strength of the field and the counter electro-motive force are increased and the current taken by said branch correspondingly diminished. To further illustrate the application of this principle of regulation, suppose there are four motors working on the same load, and suppose each motor to be receiving a current of different strength from that received by the other motors. To equalize said currents—that is, to adjust them to a mean—requires four extra coils on each motor, one being cumulative—that is, tending to strengthen the field-magnet—and connected in circuit with its own armature, and the other coils being all differential and connected one in the circuit of each of the other three motors, the arrangement being similar for said other motors. In this case the cumulative-coil would evidently require three times as many turns as any one of the differential coils, or, in other words, the sum of the number of turns in the differential coils should equal the number of turns in the cumulative-coil. This arrangement is not specifically illustrated, since it is a mere extension or enlargement of the system already described. In this case the force which effects the regulation is the difference of the ampère turns in the cumulative-coil and the sum of the ampère turns in the three differential coils on the same machine. If the correction or regulation be made by applying said difference of current in the branches to both motors, as illustrated in Figs. 1 and 2, there would be two extra coils of a certain number of turns on each motor field-magnet; but if the correction be effected entirely at one motor, as illustrated in Fig. 4, there will be two coils having about twice as many turns on one motor. Suppose, again, that instead of adjusting the value of each current to the mean, as above described, one current—for example, that received by the first motor—be adopted as the standard and the other motors be brought to that standard whenever they deviate from it. This arrangement requires only two extra coils on each of the motors other than the standard motor and no extra coils whatever on the latter, whatever the number of motors which are to be controlled, since the only thing which is to be considered is the difference between the current of the standard motor and of the individual motors to be adjusted to the standard. This is shown in Fig. 5. It will be evident, also, that the standard machine need not necessarily be one of the working motors connected to the common circuit, but may be an entirely separate machine, properly adjusted and regulated.

In Fig. 2 two generators 11 11′, instead of two motors, are shown connected in multiple arc to a common circuit 12 12′, to which are connected translating devices 13. The field-magnets of the generators are shown with equalizing-coils, (no third field-magnet coil corresponding to 4 in Fig. 1 being shown,) the coil 14 being in series with the armature-coil of generator 11, but connected so as to act differentially on the field-magnet—that is, so as to tend to reduce the strength of the field-magnet. This coil is then connected to coil 15′, which is wound on the field-magnet of generator 11′, and is so connected as to increase the strength of its field-magnet. Coils 14′ and 15 are similarly connected on generators 11′ and 11. The course of the current in the various coils and wires is clearly indicated by the arrows. Pulleys are shown to indicate means for driving the dynamos. Suppose that the speed at which the dynamos are driven varies—for example, that the armature of 11 runs at too high a speed, thus generating too much current, or that for any other reason this machine is producing too much current, the coil 14 being connected differentially, as above described, at once reduces or cuts down the strength of the field-magnet, since the effect of coil 14 becomes greater relative to that of 15, as will be evident without further description. The operation would be similar should generator 11′ be increased in speed, since 14′ would cut down the strength of the field-magnet 11′ to a point at which the current generated by the two dynamos is substantially equal. It will be clear that the same method of regulation can be applied to a different number of generators.

In Fig. 4, 19 is the field-magnet of a standard motor, and 20 the armature thereof. From the armature a wire 21 extends to one of the extra equalizing-coils 22 on the field-magnet of a second motor. The armature of the second motor is connected to the extra regulating-coil 23, the connection being such as to have an opposite magnetizing effect on the field-magnet from that of coil 22. In Fig. 5 a similar arrangement is shown in connection with three motors, and detail description of this arrangement is not necessary, the several parts being numbered to correspond with Fig. 4. In both Figs. 4 and 5 the main field-coils are omitted.

Fig. 3 shows two generators 11 11′ connected to a three-wire system having translating devices 13. On each generator are shown two equalizing-coils, as in Fig. 2; but said coils are connected so that the coil on each field-magnet which is in circuit with its own armature is cumulative—that is, tends to strengthen the field-magnet—and the coil with which it is connected on the second generator is so connected that it tends to weaken the magnetic field of said second generator. With this arrangement, when one side of the system is carrying more current than the other side, as would be the case, for example, where all the translating devices on one side are in use, as shown, while a less number are in circuit on the other side, the potential of said dynamo would be automatically brought up to compensate for the increased drop of potential on the line.

The number of turns in the several coils on the motors or generators will depend on the character of machine employed and other considerations, which will be clear to those acquainted with such machine.

It will be seen that in all of the cases mentioned the current of each armature, except in certain cases the armature of the standard machine, is passed through an extra regulating-coil on its own field-magnet, said current affecting the magnetic field in a definite manner. At the same time the standard current (which may be the current of a constant standard machine, or which may be the sum of the currents in all of the other armatures, in which case the number of turns in each of the extra coils on each field-magnet other than the coil connected with its own armature should bear such relation to the number of machines that the sum of the ampère turns in said opposing extra coils shall affect the magnetic field to the desired extent) is made to act oppositely on the magnetic field of said machine.

From examination of the three applications above given of my principle of regulation it will appear that in each application when one of several electric machines (motors or generators) is doing a proportional part of the work required in the system there is a balance established between the equalizing-coils on the several field-magnets; but when one of said machines tends to or is called upon to do more than its share of the work of the system the work done by each is equalized or the ability of the machine to do its additional work is automatically increased in like proportion, and this is effected by a very simple apparatus and arrangement of circuits, whereby the difference of currents flowing through the equalizing-coils of the machines is made to compensate or regulate, as already fully set forth.

The invention is not confined to the exact arrangement of connections herein shown and described, but can be applied to machines having modified connections without departing from the invention.

Having thus described the invention, what I claim is—

1. The method of regulating or controlling two or more motors or dynamos connected electrically, one or more of said motors or dynamos having extra field-magnet coils, which consists in increasing or diminishing the magnetic field of the machine or machines the current in which is too small by passing the current of each of such machines through one of its own extra field-coils and at the same time oppositely affecting said field or fields—that is, diminishing or increasing the same—by passing through another extra coil or other field-coils the standard current, substantially as described.

2. The method of regulating or controlling two or more motors or dynamos connected electrically, one or more of said motors or dynamos having extra field-magnet coils, which consists in increasing or diminishing the magnetic field of the machine, the armature of which has more than a proper proportion of current by the entire current in said armature and at the same time oppositely affecting—that is, diminishing or increasing—the magnetic field of said machine by the entire current in the armature of the other machine or machines, substantially as described.

3. The method of regulating or controlling several motors or dynamos connected electrically, which consists in increasing or diminishing the magnetic field of the machines, the armatures of which have more than a proper proportion of current by using the current in said armatures to affect their own magnetic fields and at the same time oppositely affecting—that is, diminishing or increasing—the magnetic fields of said machines by the current in the armatures of the other machines, the current of each of said other machines being applied to affect said magnetic fields proportionately to the number of machines, substantially as described.

4. The method of simultaneously controlling or regulating several electric machines, which consists in passing current flowing in the armature of one machine through a coil on its field-magnet so as to increase or diminish its own magnetic field and through a coil on each of the other machines so as to diminish or increase their fields, respectively, and passing current similarly through said other machines, whereby difference of current in the machines effects an automatic regulation, substantially as described.

5. The combination of two or more motors or dynamos electrically connected, an extra coil on each field-magnet in series with its own armature, and one or more other extra coils on each field-magnet, but so connected as to affect the magnetic fields oppositely to the first-mentioned extra coils, the latter extra coil or coils on each machine being connected to another machine or other machines, substantially as described.

6. The combination of two or more motors or dynamos electrically connected, an extra coil on each field-magnet in series with its own armature and in series with a coil on each of the other field-magnets, and a second extra coil on each field-magnet so connected as to affect the magnetic field oppositely to the first-mentioned extra coil and connected to a standard source of current, whereby each magnetic field will be affected in one way by the current flowing through its own armature and extra coil, and will be at the same time oppositely affected by the standard current in the other extra coil or coils, substantially as described.

7. The combination of several electric machines, each machine having a number of equalizing or regulating coils equal to the number of machines, one of the coils on each machine being connected to affect the magnetic field of that machine in one way and connected to a coil on each of the other machines in a way to oppositely affect their magnetic field, substantially as described.

8. The combination, with several electric machines connected to a common circuit, of equalizing or regulating coils on each machine, one coil on each machine being connected to its own armature and affecting its magnetic field in one way and being oppositely connected to a coil on each of the other machines, substantially as described.

9. The combination, with electric motors connected to a common circuit, of equalizing or regulating coils on each machine, one coil on each motor being connected to its own armature and affecting its magnetic field in one way and being oppositely connected to a coil on each of the other motors, substantially as described.

10. The combination, with electric motors connected to a common load, of main field-magnet coils and equalizing or regulating coils on the field-magnet of each motor equal in number to the number of motors, one of the coils on each field-magnet being connected in such manner as to affect the magnetic field in one way and the other coils being oppositely connected, substantially as described.

11. The combination, with electric motors connected to a common load and to a common circuit, of main field-magnet coils and equalizing or regulating coils on the field-magnet of each motor equal in number to the number of motors, one of the coils on each field-magnet being connected in such manner as to affect the magnetic field in one way and the other coils being oppositely connected, substantially as described.

12. The combination, with an electric machine having a main field-magnet coil connected with the armature-coil and equalizing or regulating coils, one of which is also connected to the same armature-coil and so connected as to affect said field-magnet in one way and another or others of which are so connected as to oppositely affect said field-magnet, of another machine or machines having corresponding coils, the coils of the machines being connected substantially as described.

13. The combination of two electric machines, each having a main field-magnet coil in series with its armature-coil, and two equalizing-coils, one of which on each machine is connected in series with its armature and the other of which is oppositely connected to a corresponding coil on the second machine, substantially as described.

14. The combination, with the conductors of a three-wire system, of two or more electric machines connected to the wires of said system, each machine having equalizing-coils equal in number to the number of machines, one coil on each machine being connected to a lead in such manner as to increase or diminish the magnetic field and the other coil or coils being connected to affect the magnetic field in an opposite way—that is, to diminish or increase it—the coils of the several machines being connected together and the third wire of the three-wire system being connected between said machines, substantially as described.

This specification signed and witnessed this 30th day of October, 1890.

CARY T. HUTCHINSON.

Witnesses:
CHARLES M. CATLIN,
E. COURAN.